United States Patent [19]

Reinhold

[11] Patent Number: 4,586,014

[45] Date of Patent: Apr. 29, 1986

[54] ELECTROMAGNETIC BEAM

[75] Inventor: Gasper Reinhold, Klagenfurt, Austria

[73] Assignee: Johannes Zimmer, Klagenfurt, Austria

[21] Appl. No.: 610,993

[22] PCT Filed: Aug. 26, 1983

[86] PCT No.: PCT/AT83/00026

§ 371 Date: May 2, 1984

§ 102(e) Date: May 2, 1984

[87] PCT Pub. No.: WO84/00914

PCT Pub. Date: Mar. 15, 1984

[30] Foreign Application Priority Data

Sep. 2, 1982 [AT] Austria ................. 3294/82

[51] Int. Cl.$^4$ ............................................. H01F 7/00
[52] U.S. Cl. ..................... 335/296; 335/300

[58] Field of Search ............... 335/281, 300, 296, 297, 335/289

[56] References Cited

U.S. PATENT DOCUMENTS 2,193,162  3/1940  Carter .................................. 335/300
2,627,007  1/1953  Richards, Jr. ....................... 335/300

Primary Examiner—George Harris
Attorney, Agent, or Firm—Karl F. Ross; Herbert Dubno

[57] ABSTRACT

In an electromagnetic beam respectively a beam- or carrier-like worktable for pressure coating and other processing machines operating with magnetic contact pressure, at least one pole end of the magnet cores of the electromagnet is connected in a heatproof manner by means of a magnet-connecting bridge with a support profile symmetric to the plane of the magnet core axes.

9 Claims, 5 Drawing Figures

4,586,014

ELECTROMAGNETIC BEAM

CROSS REFERENCE TO RELATED APPLICATIONS

The application is a National Phase Application of PCT/AT 83/00026 filed 26 Aug. 1983 and based, in turn, on the Austrian application A 3294/82 of 2 Sept. 1982 under the International Convention.

FIELD OF THE INVENTION

The invention relates to an electromagnetic beam, or to a beam- or carrier-like worktable of any length for printing presses, coating and other processing machines operating with magnetic contact pressure, wherein at least one electromagnet with a magnet core and magnet coil, as well as a magnet connecting bridge and a supporting structure are provided. In certain cases, the magnetic beam according to the invention can also be incorporated into a roller. In this type of magnetic beam or worktable, a big problem is to keep them completely straight or level even in the case of large overall dimensions or work width, no matter what the temperature or working conditions are, so that they can be used for the highest precision requirements.

BACKGROUND OF THE INVENTION

The constructions known to the art consist mainly of a plate stiffened with a supporting structure, in which plate the electromagnets are mounted. Individual electromagnets are inserted into the plates with their open pole end (for instance threaded into it) and are connected to each other at the opposite pole end by a bridge.

Since it is desirable for the use of the magnetic beam and often required by the processing techniques, that the magnetic beam be as straight and level as possible, when overall dimensions are increased a stronger construction of the plate together with the supporting structure is required. The operating conditions, already severed due to mechanical rigidity reasons, as aforedescribed, in practice are more difficult because, depending upon use, the magnetic beams are subject to stress not only mechanically but above all electrically and, as a result, are exposed to significant temperature variations. In rest position, which means no current, the magnetic beam is cold. Depending on the applied contact pressure or current intensity, various high temperatures result.

Based on the current state of the art, it is almost impossible to build long magnetic beams, which means magnetic beams for large work widths, which are sufficiently stable regardless of temperature.

Based on the present state of the art, temperature related bending of magnetic beams of larger dimension are unavoidable. The size of such undesired deflections can reach more than 1 mm in the case of long magnetic beams and consequently can result in considerable inaccuracy for the process to be carried out with the aid of the magnetic beam.

Sometimes, cooling jets are incorporated as means to keep the temperatures and as a result the straightness constant. Other cooling methods are also available. Cooling systems are not only expensive but they also have to be considered as a poor means only to temporarily keep the heat conditioned deflections within somewhat acceptable limits.

Complete precision in the straightness of electromagnetic beams which are subject to various work loads or current intensities and temperature variations resulting therefrom can not be achieved with the present state of the art.

OBJECT OF THE INVENTION

The object of the present invention is a new construction concept which eliminates deflections due to temperature variations.

SUMMARY OF THE INVENTION

This invention is based on the discovery that the disturbing deflections are caused not by the absolute differences in temperature, but by the relative temperature differences occuring with respect to each other within the interior of the structure.

According to the invention with regard to the abovementioned magnetic beam or beam- or carrier-like worktable, each magnet core is connected in a heat-proof manner, at least at its pole and carrying the magnet connecting bridge, with a support profile symmetric to the plane of the axes of the magnet cores.

BRIEF DESCRIPTION OF THE DRAWING

The invention is further described with the aid of the accompanying drawing in which:

FIG. 3 is a similar view of another embodiment of the invention;

SPECIFIC DESCRIPTION

Figure 1:
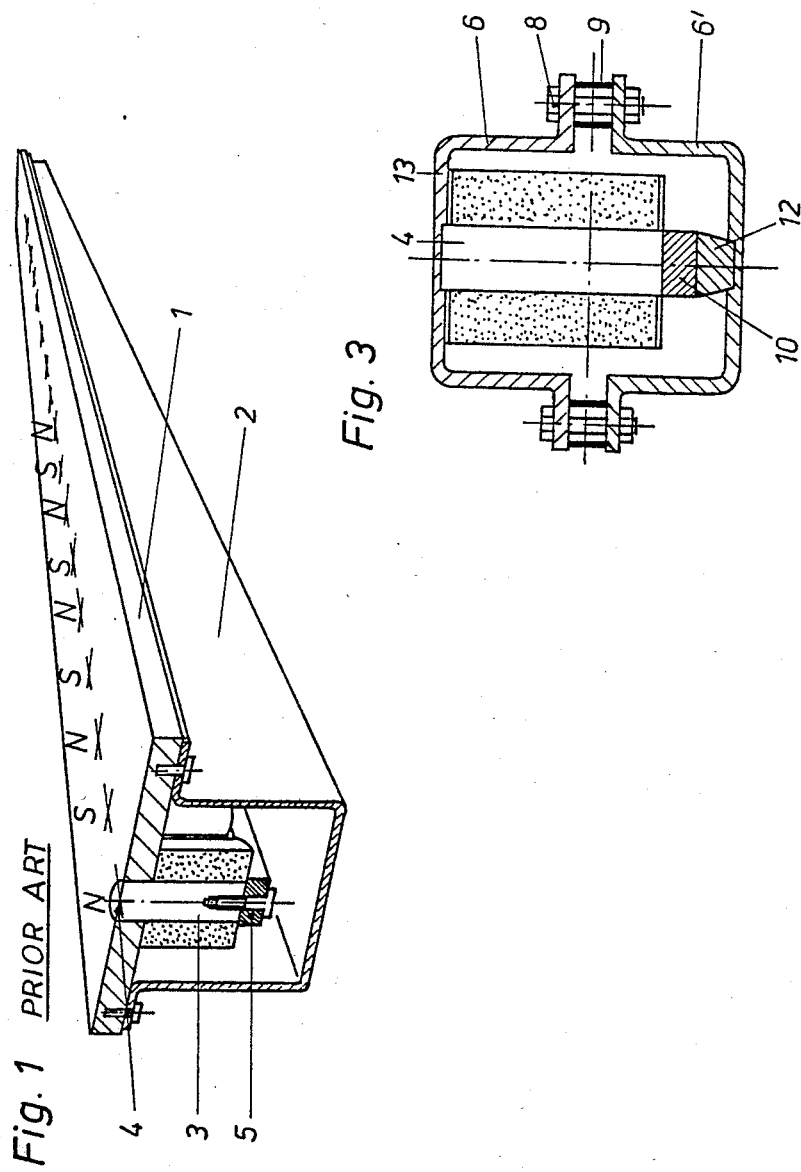
FIG. 1 is a perspective view of a construction based on the state of the art.

According to FIG. 1, the plate 1 is reinforced by a support structure 2 and electromagnets 3 are mounted in the plate 1. The individual electromagnets 3 are connected to the plate 1 at their free pole ends 4, for instance by threading into it, and said electromagnets are connected to each other at their other pole ends by means of the connecting bridge 5.

Figure 2:
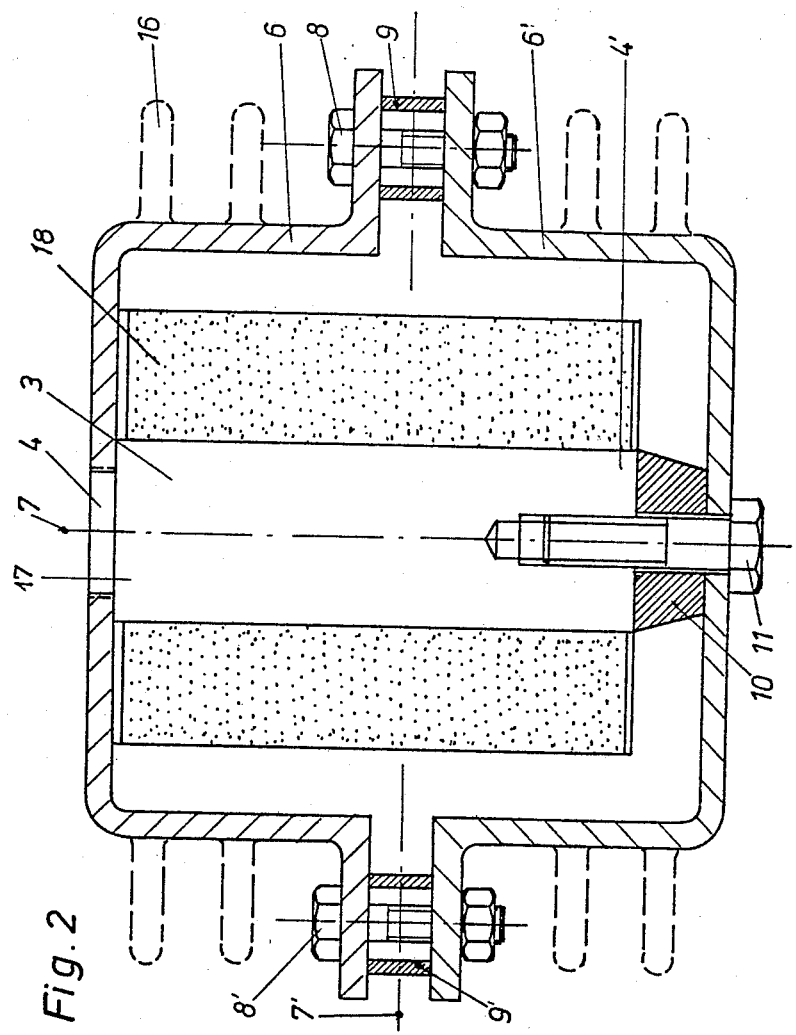
FIG. 2 is a transverse section through a magnetic beam construction according to the invention.

The first mode of construction of the magnetic beam according to the invention shown in FIG. 2 consists of a case-shaped support profile 6, 6', homogeneous and conditioned by its design, also made of a material, for instance light metal, shaped evenly and symmetrically with respect to the median planes 7,7'.

In this construction connected for instance by bolts 8, 8' and bushing spacers 9, 9', the electromagnet systems 3 (with wire coils 18 wound around magnet cores 17, advantageously arranged in pairs) are mounted so that the heat dissipaion takes place at both pole ends 4, 4' evenly and symmetrically in all directions via a form-locking connection with the case profile 6, 6'. At the pole ends 4' the heat transfer takes place through the magnet connecting bridge 10.

The pole end 4 is threaded into the case profile 6 and the pole end 4' is connected with the case profile 6' by the bolt 11 as well as the magnet connecting bridge 10.

As a further feature according to the invention, a heat dissipation bar 12 which is magnetically non-conductive, can be mounted in addition to the magnetic bridge 10, said bar determining via a formlocking connection the heat transfer to the part of the support and heat-dissipation profile opposite to the work side. This variant is illustrated in FIG. 3.

FIG. 3 shows the magnetic-beam construction according to the invention in a variant wherein the magnetic cores are not threaded into the profile 6 with their pole ends 4 directed towards the work surface 13, but they are fastened by the compression joints 8 and 9 between the two halves of the profile 6, 6' so that the magnetic force exiting the free pole end 4 of the cores has to pass through the profile 6 the wall 13.

Figure 4:
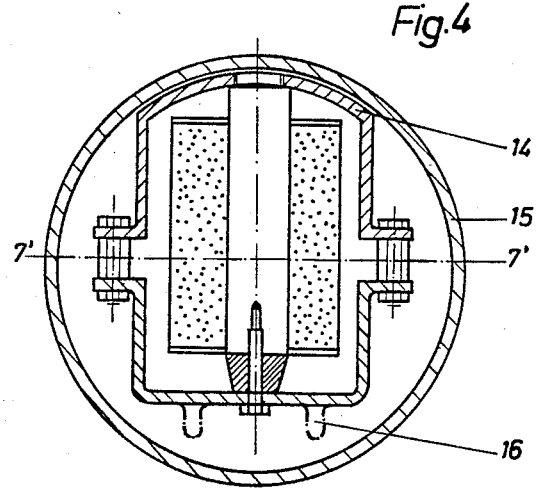
FIG. 4 is a transverse section of yet another embodiment.

FIG. 4 shows another construction of the magnetic beam according to the invention having an arched profile 14, whose shape is suited for mounting in a magnetic roller 15.

In the case of magnetic rollers the straightness is extremely important in order to keep the clearance between the magnetic beam and the roller shell as narrow as possible. Following the concept of the invention, the symmetry plane 7' is to be considered not from the point of view of formal symmetry, but from the point of view of heat dissipation symmetry.

In addition, in FIGS. 2 and 4 the possibility to provide cooling ribs 16 is suggested in dotted lines.

The possibility to built or triple magnetic beams based on the concept of this invention is a logical conclusion and is therefore not shown in the drawing.

Figure 5:
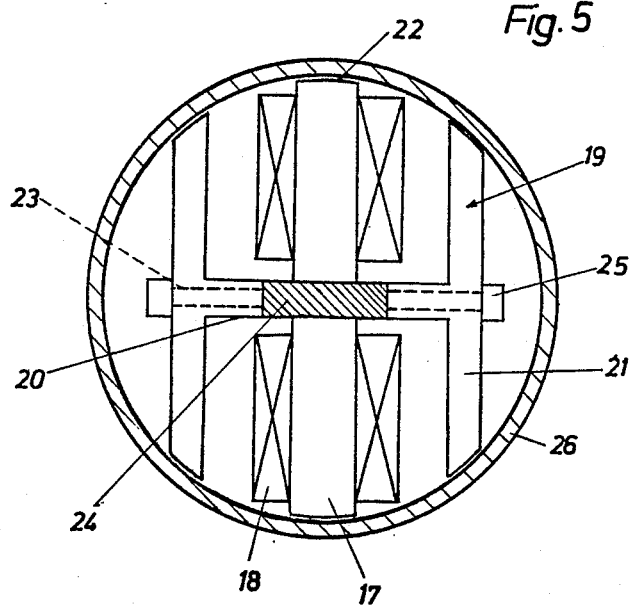
FIG. 5 shows a different type of construction based on the invention in transverse section.

In FIG. 5 a second embodiment of the construction according to the invention is shown. To illustrate this, a magnetic roller in which one or more electromagnets have been mounted, was selected. It is of course possible to mount the construction according to the invention in a different shell. The end of the magnet core 17 opposite to the work surface rests in this case also on a magnet-connecting bridge 24. This magnetic bridge 24 is mounted in an H-shaped support profile 19 and namely in its transverse spar 20. The connection between the support profile itself and the magnetic bridge 24 can be made for instance by the screws 23. The H-shaped support profile 19 is either suspended in the area of its transverse spars 20 to the supports 25 or its longitudinal spars 21 rest on corresponding supports (not shown). In this case however, the magnetic bridge 24 is connected only at one side with a magnetic core 17. Due to the fact that the magnet core 17 and the symmetric support profile 19 constitute a construction unit a symmetrical dissipation of the heat caused by the passage of the current through coils 18 occurs. Thus, a support beam construction results which is free of the bimetal effect and also serves as a heat-dissipation and radiation element.

Due to the fact that the magnetic beam has no cover plate, the magnet core 17 can be brought very close to the shell 26 and can actually touch it. But in most cases a minimal clearance 22 between the end of the magnet core 17 and the shell 26 is left. In addition, the core 17 has to extend only minimally over the ends of the coils 18. This leads to a very narrow distance to those devices supposed to be influenced by the magnetic field, as for instance a wiper made of magnetizable material, pressing device and the like. This translates into the capability of either having a stronger magnetic field with equal current supply to the coils 18 or to obtain the same magnetic force with lower energy supply, which in turn results in diminished heat generation.

The longitudinal spars 21 of the support profile 19 can either extend as one piece over the entire length of the magnetic beam or each support profile 19 can include only one, respectively two electromagnets, whereby the individual support profiles are connected to each other through the magnet connecting bridge 24, extending over all the electromagnets or in certain cases through suspension ledges 25, which means that the support construction in this case is divided sectionally.

To further facilitate heat dissipation, it is possible to provide in addition a cooling device, such as a blower, in the middle of the electromagnetic beam. For this purpose, it is possible for instance to provide a duct at one side of the H-shaped support profile 19 having openings distributed over its length for the passage of the corresponding cool air.

It must be specifically stressed that the electromagnet shown in the lower half of FIG. 5 can be omitted. The embodiment with the two electromagnets opposite to each other can be used under force-optimizng circumstance or in special cases. When the electromagnets are connected only to one side of the magnetic bridge 24, the transverse spar or spars 20 can be mounted lower so that the cores 17 can be extended.

The invention is not limited to the represented embodiments.

I claim:

1. In a coating or printing apparatus in which a member applies a coating or printing substance to a web with a pressure generated at least in part by magnetic attraction of said member toward an electromagnetic beam, the improvement wherein thermal energy is dissipated from said beam in a blowerless construction which comprises:

a row of spaced-apart electromagnets each having a coil surrounding a pole piece, the axis of said pole pieces lying in a common plane and said pole pieces having active ends turned toward said member;

a continuous magnetically permeable connecting bridge in the form of a bar narrower than said electromagnets lying in said plane and secured to the opposite ends of said pole pieces all along said row; and a support profile secured to said bridge, symmetrical with respect to said plane and in a heat-conducting relationship with said bridge and said pole pieces, said profile having portions flanking said electromagnets and at least one flange extending inwardly toward said bridge.

2. The improvement defined in claim 1 wherein said profile has a box configuration and is connected to said pole pieces at both ends thereof in a heat-conducting manner.

3. The improvement defined in claim 2 wherein said profile is also symmetrical in a plane perpendicular to the first mentioned plane.

4. The improvement defined in claim 1 wherein said profile comprises a pair of mirror-symmetrical members joined together and of identical composition, further comprising bolt means for securing said members together.

5. The improvement defined in claim 1 wherein an end of said pole piece is threaded and is screwed into a threaded bore in said profile.

6. The improvement defined in claim 1 wherein said profile comprises a pair of profiled halves clamping said bridge between them.

7. The improvement defined in claim 1 in which said profile has an H-cross section with a transverse spar connected to said bridge.

8. The improvement defined in claim 7 wherein respective electromagnets are provided symmetrically on opposite sides of said spar.

9. The improvement defined in claim 8 wherein said beam is located in a roller.

* * * * *